(12) United States Patent
Fullerton et al.

(10) Patent No.: US 7,732,071 B2
(45) Date of Patent: *Jun. 8, 2010

(54) PERPENDICULAR MAGNETIC RECORDING SYSTEM WITH PATTERNED MEDIUM AND MANUFACTURING PROCESS FOR THE MEDIUM

(75) Inventors: Eric Edward Fullerton, Morgan Hill, CA (US); Olav Hellwig, San Jose, CA (US); Jeffrey S. Lille, Sunnyvale, CA (US); James Terrence Olson, Santa Cruz, CA (US); Petrus Antonius VanDerHeijden, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 693 days.

This patent is subject to a terminal disclaimer.

(21) Appl. No.: 11/558,846

(22) Filed: Nov. 10, 2006

(65) Prior Publication Data

US 2008/0112079 A1 May 15, 2008

(51) Int. Cl.
*G11B 5/66* (2006.01)
(52) U.S. Cl. .................................. 428/836.1
(58) Field of Classification Search ........................ None
See application file for complete search history.

(56) References Cited

U.S. PATENT DOCUMENTS 4,137,141 A 1/1979 Henry et al.
5,372,843 A * 12/1994 Miyamura et al. .......... 427/130

(Continued)

FOREIGN PATENT DOCUMENTS

JP 2004062995 2/2004

(Continued)

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

(Continued)

*Primary Examiner*—Holly Rickman
(74) *Attorney, Agent, or Firm*—Thomas R. Berthold

(57) ABSTRACT

A patterned perpendicular magnetic recording medium of the type that has spaced-apart pillars with magnetic material on their ends and with nonmagnetic trenches between the pillars is made with a method that allows use of a pre-etched substrate. The substrate has a generally planar surface at the trenches and comprises material that when heated will diffuse into the magnetic recording layer material and chemically react with one or more of the elements typically used in the recording layer. The pillars are formed of material that will not diffuse into the recording layer. After the recording layer is formed over the entire substrate so as to cover both the pillar ends and the trenches, the substrate is annealed. This results in the destruction or at least substantial reduction of any ferromagnetism in the recording layer material in the trenches so that the trenches are nonmagnetic. The annealing does not affect the recording layer on the ends of the pillars because the pillars are formed of material that will not diffuse into the recording layer.

6 Claims, 7 Drawing Sheets

U.S. PATENT DOCUMENTS

| | | |
|---|---|---|
| 5,571,591 A | 11/1996 | Brady et al. |
| 5,585,140 A | 12/1996 | Brady et al. |
| 5,587,223 A | 12/1996 | White |
| 5,774,783 A | 6/1998 | Kaitsu et al. |
| 5,820,769 A | 10/1998 | Chou |
| 5,858,474 A | 1/1999 | Meyer et al. |
| 5,900,729 A | 5/1999 | Moser et al. |
| 6,331,364 B1 | 12/2001 | Baglin et al. |
| 6,383,597 B1 | 5/2002 | Fullerton et al. |
| 6,440,520 B1 | 8/2002 | Baglin et al. |
| 6,754,017 B2 | 6/2004 | Rettner et al. |
| 7,067,207 B2 | 6/2006 | Kamata et al. |
| 2005/0122609 A1* | 6/2005 | Albrecht et al. ............... 360/55 |
| 2007/0026265 A1* | 2/2007 | Sakurai et al. ........... 428/848.3 |

FOREIGN PATENT DOCUMENTS

| | | |
|---|---|---|
| WO | 2006007909 A1 | 1/2006 |

OTHER PUBLICATIONS

Hu et al., "Magnetic and recording properties of Co/Pd islands on prepatterned substrates", J. Appl. Phys., vol. 95, No. 11, Part 2, Jun. 1, 2004, pp. 7013-7015.

Terris et al., "Topical Review: Nanofabricated and self-assembled magnetic structures as data storage media", J. Phys. D: Appl. Phys. 38 (2005) R199-R222.

Eleftheriou et al., "Millipede-A MEMS-Based Scanning-Probe Data-Storage System", IEEE Transactions on Magnetics, vol. 39, No. 2, Mar. 2003, pp. 938-945.

* cited by examiner

PERPENDICULAR MAGNETIC RECORDING SYSTEM WITH PATTERNED MEDIUM AND MANUFACTURING PROCESS FOR THE MEDIUM

BACKGROUND OF THE INVENTION

1. Field of the Invention

This invention relates generally to patterned perpendicular magnetic recording media, such as disks for use in magnetic recording hard disk drives, and more particularly to patterned disks wherein the data bits are stored on elevated magnetic data islands isolated from one another by recessed nonmagnetic regions.

2. Description of the Related Art

Magnetic recording hard disk drives with patterned magnetic recording media have been proposed to increase data density. In patterned media the magnetic recording layer on the disk is patterned into small isolated data islands arranged in concentric data tracks. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned data islands, the magnetic moment of the spaces between the islands must be destroyed or substantially reduced to render these spaces essentially nonmagnetic. In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. It was believed that because the trenches were recessed they would be far enough from the read/write head to not adversely affect reading or writing. This type of patterned media is described in U.S. Pat. No. 6,440,520, and by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736. This type of patterned media with perpendicular magnetization on the pillar ends is believed to provide opportunity for ultra-high density magnetic recording. However, it has been discovered that the magnetic material in the trenches creates noise in the readback signal and also adversely affects writing the individual data bits (i.e., magnetizing the recording material on the pillar ends).

What is needed is a patterned perpendicular magnetic recording medium with pillars having magnetic material on their ends and with trenches that have essentially no magnetic moment, and a manufacturing process for the medium that allows use of pre-etched substrates.

SUMMARY OF THE INVENTION

The invention is a patterned perpendicular magnetic recording medium of the type that has spaced-apart pillars with magnetic material on their ends and with trenches between the pillars that are nonmagnetic regions. The medium is made with a method that allows use of a pre-etched substrate. The substrate has a generally planar surface at the trenches and comprises material, such as silicon (Si) or germanium (Ge), that when heated will diffuse into the magnetic recording layer material and chemically react with one or more of the elements typically used in the recording layer, such as cobalt (Co), iron (Fe), platinum (Pt) and palladium (Pd). The substrate may be a semiconductor-grade single-crystal Si wafer or a rigid support structure or base with an amorphous Si layer. In one embodiment, the pillars that extend from the planar surface are formed of a material that will not diffuse into the recording layer. Such materials include a silicon oxide such as $SiO_2$, a silicon nitride (SiN), alumina ($Al_2O_3$), and refractory metals and their alloys, e. g., tungsten (W), molybdenum (Mo), niobium (Nb), tantalum (Ta), and rhenium (Re). After the recording layer is formed over the entire substrate so as to cover both the pillar ends and the trenches, the substrate is heated to a temperature and for a time sufficient to cause the recording layer material in the trenches and the material in the substrate to diffuse into one another and chemically react. This results in the destruction or at least substantial reduction of any ferromagnetism in the recording layer material in the trenches, meaning that the trenches exhibit no significant magnetic moment after exposure to an applied magnetic field. However, the heating does not affect the recording layer on the ends of the pillars because the pillars are formed of a material that will not diffuse into the recording layer.

The substrate may also include a "soft" or relatively low-coercivity magnetically permeable underlayer (SUL) to provide a magnetic flux return path for the magnetic field from the write head. If a SUL is used, then a diffusion barrier is formed on the SUL beneath the surface from which the pillars extend to prevent diffusion between the Si or Ge of the substrate and the magnetic material in the SUL.

In another embodiment, the substrate has a first diffusion barrier with a generally planar surface from which the pillars extend, with the pillars being formed of Si or Ge. A second diffusion barrier is located on the pillar ends beneath the recording layer. The diffusion barriers may be a material, such as Ta or SiN, that prevent diffusion between the Si or Ge in the pillars and the recording layer material. During heating of the substrate, the recording layer material in the trenches and the Si or Ge in the pillars near the trenches diffuse into one another and chemically react to create nonmagnetic regions in the trenches. The second diffusion barrier on the ends of the pillars prevents diffusion between the Si or Ge of the pillars and the recording layer. If a SUL is used in this embodiment, the first diffusion barrier prevents diffusion between the Si or Ge of the pillars and the magnetic material in a SUL.

The patterned perpendicular magnetic recording medium of this invention may be implemented in a magnetic recording disk drive in which the pillars are pattered on the disk in an array of concentric circular data tracks. The medium may also be implemented in a scanning probe type of magnetic recording system in which the pillars are patterned on the substrate in an x-y array of mutually perpendicular rows.

For a fuller understanding of the nature and advantages of the present invention, reference should be made to the following detailed description taken together with the accompanying figures.

DETAILED DESCRIPTION OF THE INVENTION

Figure 1:
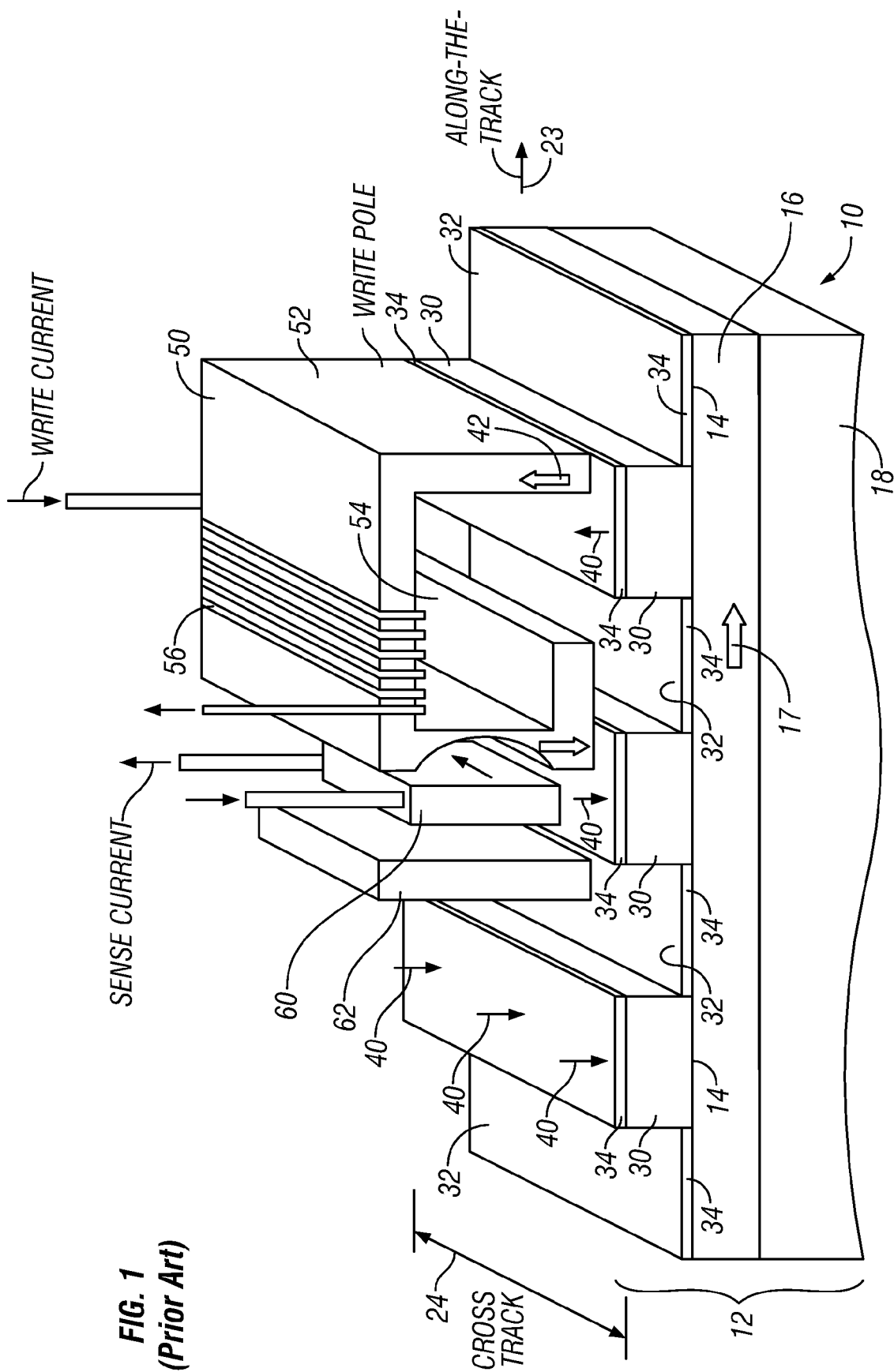
FIG. 1 is a schematic representation of a perpendicular magnetic recording system with a prior art patterned perpendicular medium.

FIG. 1 is a schematic representation of a prior art perpendicular magnetic recording system with patterned perpendicular media. The system can be implemented in a magnetic recording disk drive, with the medium being a magnetic recording disk with the patterned bits arranged into concentric circular data tracks. FIG. 1 thus shows a portion of a disk 10 that includes a substrate 12 with a generally planar surface 14. A plurality of discrete patterned islands or pillars 30 extend generally perpendicularly from the surface 14 and are part of substrate 12. The pillars 30 are spaced apart, leaving troughs or trenches 32 recessed below the ends of the pillars 30. A layer 34 of perpendicular magnetic recording material is formed on the ends of the pillars 30 as well as on surface 14 in the trenches 32. The recording layer 34 on each of the pillars 30 is magnetized perpendicularly, as depicted by arrows 40, resulting in the recorded bits being stored in the recording layer 34 in a generally perpendicular or out-of-plane orientation (i.e., other than parallel to the surface of the recording layer 34). In this type of patterned media, even though there is magnetic recording layer material in the trenches, the perpendicular spacing between the trenches and the ends of the pillars is the basis for isolating the recorded bits. However, as will be described below, the magnetic material in the trenches may still adversely affect reading and writing of the bits. As shown in FIG. 1, the substrate 12 may also include an optional "soft" or relatively low-coercivity magnetically permeable underlayer (SUL) 16 formed on a rigid disk support structure or base 18.

Also shown in the schematic of FIG. 1 is the read head 60 and the write head 50 (with write pole 52 and a return pole 54). Write current passes through a coil 56 of the write head 50 to generate a magnetic field (arrow 42) at the write pole 52. This magnetic field magnetizes the recording layer 34 on the pillar 30 beneath the write pole in the direction 40. The SUL 16 serves as a flux return path (arrow 17) for the magnetic field between the write pole 52 and the return pole 54 of the write head 50. The detection or reading of the recorded bits is by a read head 60, typically a magnetoresistive (MR) read head, such as a tunneling MR (TMR) read head in which a sense current passes perpendicularly through the layers making up the head. A shield 62 of magnetically permeable material may be used to prevent magnetizations from bits other than the bit being read from reaching the read head 60.

Figure 2:
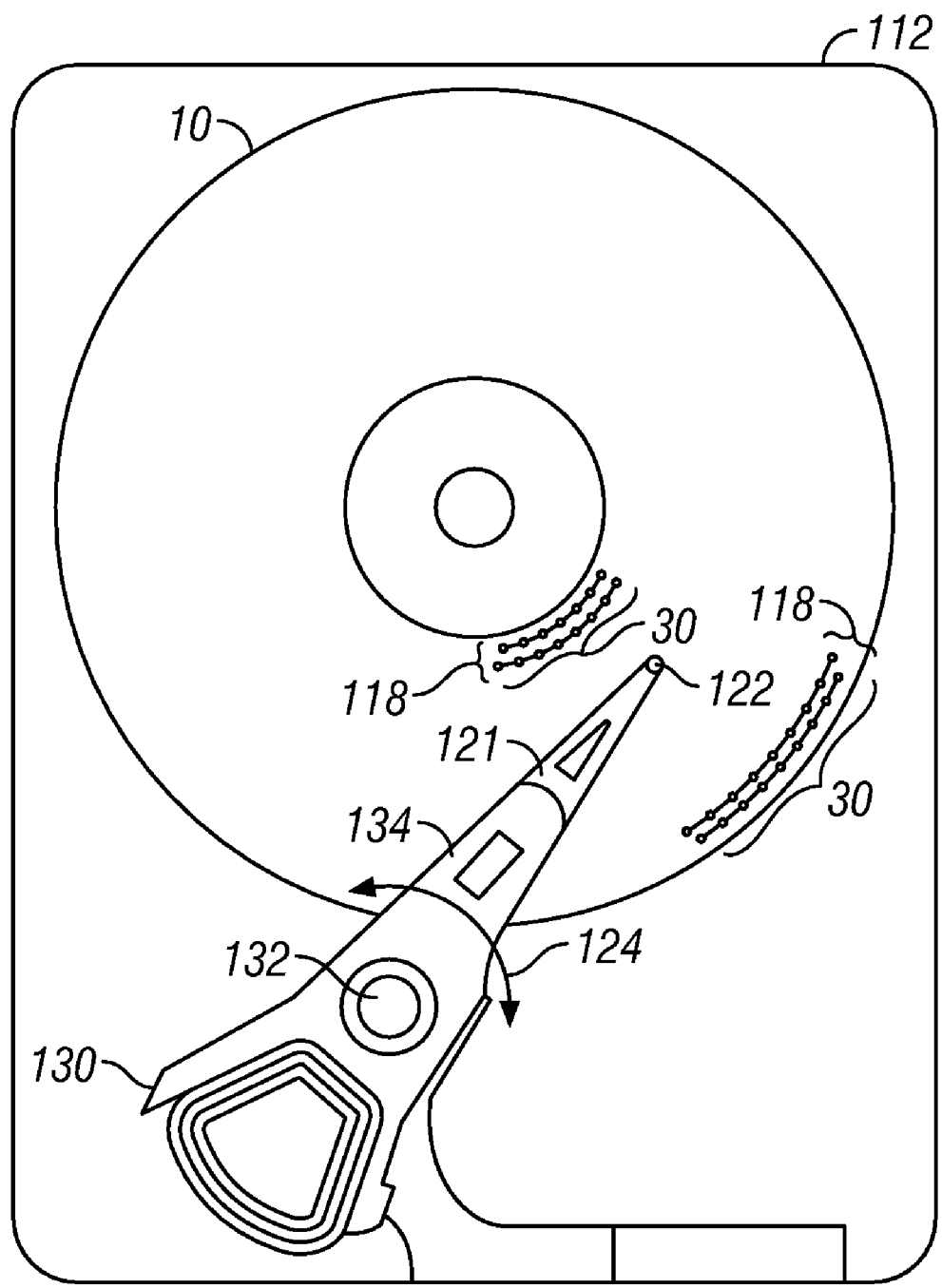
FIG. 2 is a top view of a disk drive implementation of the system illustrated in FIG. 1 and shows the patterned bits arranged in concentric circular data tracks.

FIG. 2 is a top view of a disk drive implementation of the system illustrated in FIG. 1. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. The read head 60 (FIG. 1) and write head 50 (FIG. 1) are typically formed as an integrated read/write head (not shown) patterned on the trailing surface of the head carrier 122. The pillars 30 on disk 10 are arranged in radially-spaced concentric circular data tracks 118. As the disk 10 rotates, the movement of actuator 130 allows the read/write head on the trailing end of head carrier 122 to access different data tracks 118 on disk 10. The writing on patterned media requires the synchronization of the write pulses with the pattern of pillars. A patterned media magnetic recording system that uses the magnetized pillars to clock the writing is described in U.S. Pat. No. 6,754,017 assigned to the same assignee as this application.

In the perpendicular magnetic recording system with the patterned disk 10 as shown in FIG. 1, only the perpendicular magnetic recording layer 34 on the ends of the pillars 30 contributes to the readback signal, with each pillar 30 representing one bit. The magnetic recording layer material that is located in the trenches 32 does not significantly contribute to the signal, but can act as a noise source. In addition, the magnetic material in the trenches may increase coupling of neighboring bits via direct exchange or indirectly via dipolar interactions, thus preventing or reducing the possibility of single-bit addressing during writing. The magnetic material in the trenches may also have a domain structure that generates undesired stray fields which can cause uncontrolled switching of neighboring bits during writing. Thus even though the disk 10 can be fabricated with a relatively large perpendicular spacing between the ends of pillars 30 and the trenches 32, it is desirable to avoid magnetic material in the trenches to achieve maximum signal-to-noise ratio and optimal recording performance.

Figure 3A:
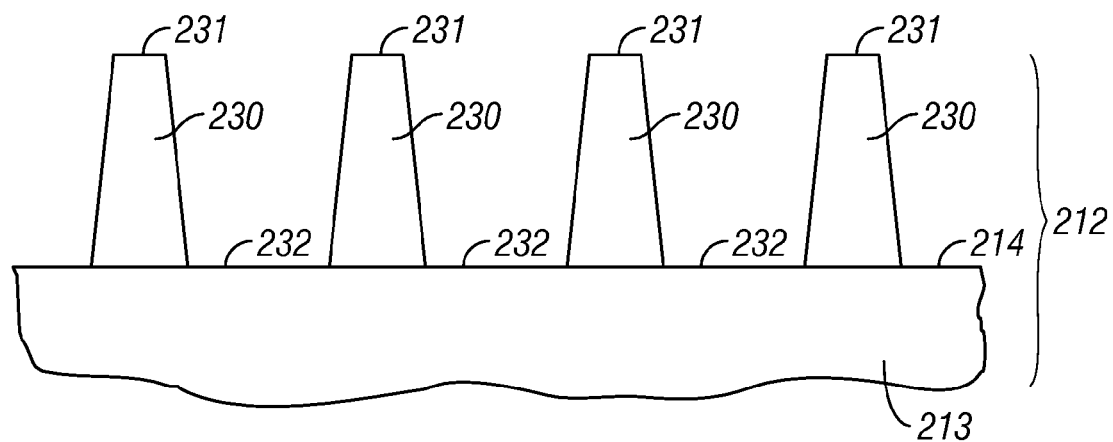
FIGS. 3A-3C are sectional views of a disk according to one embodiment of the invention at various stages of the manufacturing process.
Figure 3B:
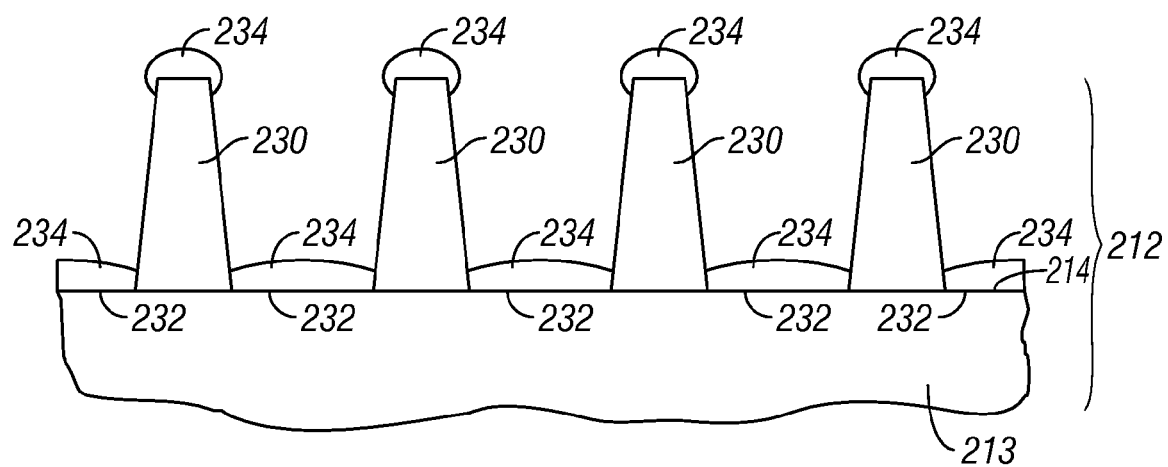
Figure 3C:
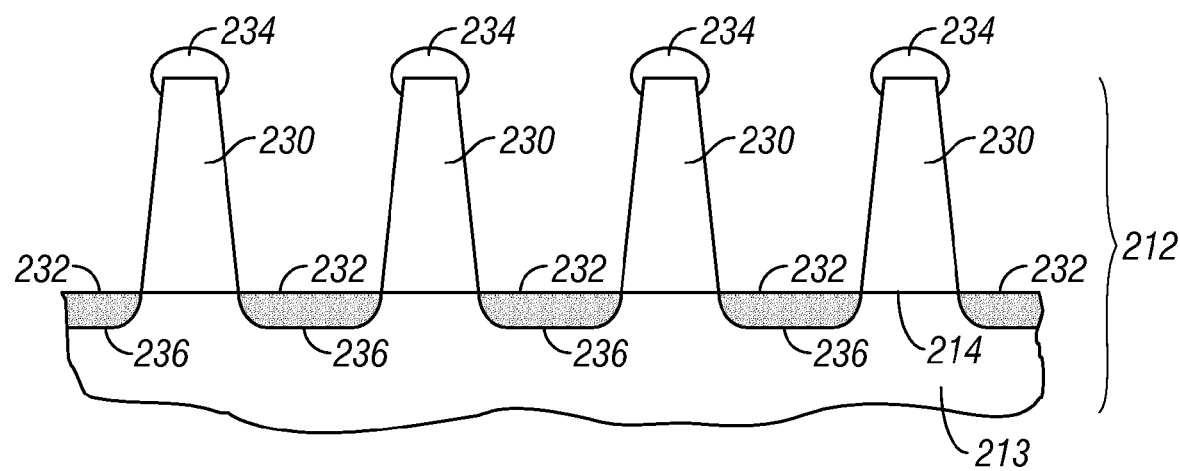

FIGS. 3A-3C are sectional views of a disk according to one embodiment of this invention at various stages of the manufacturing process. FIG. 3A shows one embodiment of a pre-etched substrate 212 with generally planar surface 214 and pillars 230 extending from surface 214. The pillars have tops or ends 231 that are generally coplanar. The regions between the pillars 230 at surface 214 are trenches 232. The substrate 212 includes a layer 213 of material, hereafter called "diffusion" material. The diffusion layer 213 is formed of a material that when heated is capable of diffusing into and chemically reacting with the recording layer material, which typically includes one or more elements such as Co, Fe, Pd and Pd. The preferred diffusion materials for layer 213 include Si and Ge. The pillars 230 are formed of a "non-diffusion" material, i.e., a material that when heated does not diffuse into or chemically react with the magnetic recording layer. The pillars 230 may thus be formed of a silicon oxide such as $SiO_2$, a silicon nitride (SiN), alumina ($Al_2O_3$), and refractory metals and their alloys, e. g., tungsten (W), molybdenum (Mo), niobium (Nb), tantalum (Ta), and rhenium (Re).

The pre-etched substrate 212 can be fabricated by any well-known technique, such as conventional lithography, direct-write electron-beam (e-beam) lithography, and nanoimprinting. For example, the substrate 212 may start as a rigid silicon wafer, such as a semiconductor-grade single-crystal silicon wafer, that serves as diffusion layer 213 with outer surface 214. Alternatively, the substrate 212 may be a rigid base onto which an amorphous Si layer is sputter deposited, with the amorphous Si layer serving as the diffusion layer 213 with outer surface 214. A non-diffusion layer of SiN or $SiO_2$ is then deposited or formed over the entire surface 214 to a thickness generally corresponding to the desired height for the pillars 230. For example, if the non-diffusion layer is $SiO_2$ it can be formed by thermal oxidation of the silicon wafer. Because the non-diffusion layer will be etched down to surface 214 to form the pillars 230, an optional etch-stop layer (not shown), such as a 2-3 nm thick film of carbon (C) or aluminum (Al), may be deposited over the entire surface 214 prior to deposition of the non-diffusion layer. The structure is then patterned and etched to remove the non-diffusion material, leaving the pattern of pillars 230 and trenches 232. A second etch is then used to remove the etch-stop material in the trenches 232.

In a nanoimprinting process, a master template is fabricated, typically by direct e-beam writing, to have the desired pattern. After the non-diffusion layer, e.g., $SiO_2$, is formed over the entire surface 214 of substrate 212, a thin film of imprint resist (i.e., a thermal plastic polymer) is spin coated onto the $SiO_2$ layer. Then the master template with its predefined pattern is brought into contact with the imprint resist film and the template and substrate are pressed together and heat is applied. When the resist polymer is heated above its glass transition temperature, the pattern on the template is pressed into the resist film. After cooling, the master is separated from the substrate and the patterned resist is left on the $SiO_2$ layer. Reactive-ion-tching (RIE) can be used to transfer the pattern in the resist to the underlying $SiO_2$ layer. The optional etch-stop layer would facilitate the termintion of the RIE.

In a direct-write e-beam patterning process, after the non-diffusion layer, e.g., $SiO_2$, is formed over the entire surface 214 of substrate 212, a thin resist layer, such as poly-methylmethacrylate (PMMA), can be deposited on the $SiO_2$ layer. The resist layer is then patterned with an e-beam tool. After this resist layer is developed, a pattern of holes is left in the resist layer. A thin chromium (Cr) layer can then be deposited into the holes and onto the patterned resist layer. In the following lift-off process, the remaining resist together with the Cr on top of it is removed, leaving a pattern of Cr dots. This pattern is transferred onto the $SiO_2$/Si by reactive ion etching (RIE) using the Cr dots as a hard mask. The optional etch-stop layer would facilitate the termintion of the RIE. After the desired trench depth (i.e., the height of the pillars) is achieved, the Cr layer is removed and the substrate cleaned. The above-described nanoimprinting and direct-write e-beam patterning processes are well-known and described in further detail in numerous references, including G. Hu, et al., "Magnetic and recording properties of Co/Pd islands on prepatterned substrates", *J. Appl. Phys.*, Vol. 95, No. 11, Part 2, 1 Jun. 2004, pp. 7013-7015.

FIG. 3B is a sectional view of the substrate 212 after deposition of the magnetic recording layer 234. A protective overcoat (not shown), such as an amorphous "diamond-like" carbon film or a silicon-nitride film, may be formed on top of the magnetic recording layer 234. The deposition of magnetic recording layer 234 is typically by conventional sputter deposition and results in the material of the recording layer 234 being deposited on the ends of pillars 230 as well as in the trenches 232 at surface 214. The preferred recording layer 234 is a multilayer with perpendicular magnetic anisotropy, such as a Co/Pt, Co/Pd, Fe/Pt or Fe/Pd multilayer. In a typical example, 4-10 films of Pd (each approximately 0.4 to 1.2 nm thick) and 4-10 films of Co (each approximately 0.2 to 0.5 nm thick) are alternately deposited to form a Co/Pd multilayer. Prior to the deposition of the multilayer it is common to deposit an adhesion layer (e.g., Cr or Ta) with thickness in the range of about 0.5 to 4 nm and an initial Pd layer with a thickness in the range of about 0.5 to 4 nm. The thickness of the resulting structures is in the range of about 6 to 15 nm. The pillars 230 have a typical thickness of approximately 5 to 50 nm, with the centers of the pillars 230 being spaced apart by approximately 50 to 25 nm. This would result in the disk 10 having an areal bit density of approximately 250 to 1000 $Gbits/in^2$.

In addition to a multilayer, the recording layer 234 may be formed of any of the known amorphous or crystalline materials and structures that exhibit perpendicular magnetic anisotropy. Thus, a granular polycrystalline cobalt alloy, such as a CoPt or CoPtCr alloy, with or without an oxide, such as oxides of Si, Ta, Ti, Nb, Cr, V and B, may be used. In addition, magnetic materials containing rare earth elements are useable, such as CoSm, TbFe, TbFeCo, GdFe alloys. The recording layer 234 can also be formed of chemically ordered CoPt, CoPd, FePt, FePd, $CoPt_3$ or $CoPd_3$. These chemically ordered alloys, in their bulk form, are known as face-centered tetragonal (FCT) $L1_0$-ordered phase materials (also called CuAu materials). The c-axis of the $L1_0$ phase is the easy axis of magnetization and is oriented perpendicular to the substrate. Like the Co/Pt and Co/Pd multilayers, these layers have very strong perpendicular magnetic anisotropy.

In this invention the structure of FIG. 3B is annealed. This results in the structure depicted schematically in FIG. 3C, wherein the magnetic recording layer material in the trenches 232 and the material of diffusion layer 213 diffuse together and chemically react. This creates nonmagnetic regions 236 at the surface 214 in the trenches 232. The material of the recording layer 234 includes at least one element selected from the group consisting of Co, Fe, Pt and Pd, and at least one of these elements reacts with the material of the diffusion layer 213. The annealing results in the destruction or at least substantial reduction of any ferromagnetism in the nonmagnetic regions 236, meaning that these regions exhibit no significant magnetic moment after exposure to an applied magnetic field. However, the annealing does not significantly modify the ferromagnetic properties of the recording layer 234 on the ends of pillars 230 because the pillars 230 are formed of non-diffusion material, such as SiN or $SiO_2$. For example, if the recording layer material includes Co and the diffusion layer 213 comprises Si or Ge, then the nonmagnetic regions 236 would include the non-ferromagnetic compound $Co_2Si$ or $Co_2Ge$, respectively. Depending on the elements in the magnetic recording layer material and the composition of the diffusion layer, other possible non-ferromagnetic compounds that may be formed include $Fe_3Si$, $Fe_3Ge$, and a range of metastable crystalline and amorphous alloys. The diffusion of Si and Ge with ferromagnetic Co and Fe to render magnetic regions nonmagnetic is known. For example, U.S. Pat. No. 5,585,140 describes manufacturing a discrete-track magnetic recording disk for longitudinal recording by first patterning the continuous magnetic film with concentric rings of Si or Ge and then annealing to create a planar surface of concentric magnetic data tracks separated by concentric nonmagnetic rings.

The annealing time and temperature can be determined experimentally, depending on the materials for the recording layer and diffusion layer and the thickness of the recording layer material. In one example, a Co/Pd multilayer of 8 alternating films with a total thickness of 11 nm was deposited on a single-crystal silicon wafer. Annealing at 260° C. for 10 minutes completely destroyed ferromagnetism in the multilayer. By comparison, when the same multilayer was formed on a 1.5 nm thick Ta non-diffusion layer on a single-crystal silicon wafer and annealed at the same temperature for the same time, no affect on the ferromagnetism of the multilayer could be detected.

FIGS. 3B-3C illustrate a process wherein no material of recording layer 234 is deposited on the sidewalls of pillars 230 so that the recording layer material on the tops 231 of the pillars 230 is physically and thus magnetically separated from the recording layer material in the trenches 232.

Figure 3D:
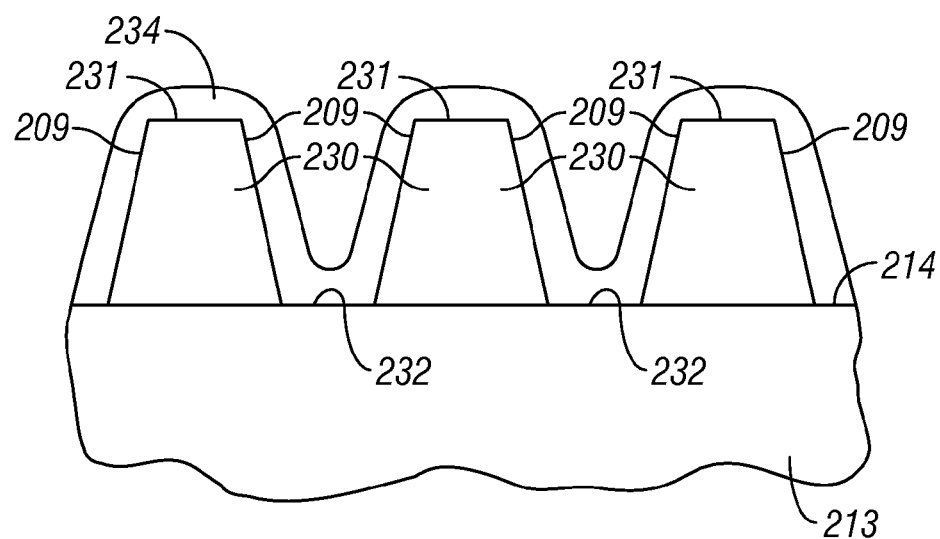
FIGS. 3D-3E are sectional views showing a variation of the process of FIGS. 3A-3C wherein the recording layer material is also deposited on the pillar sidewalls.
Figure 3E:
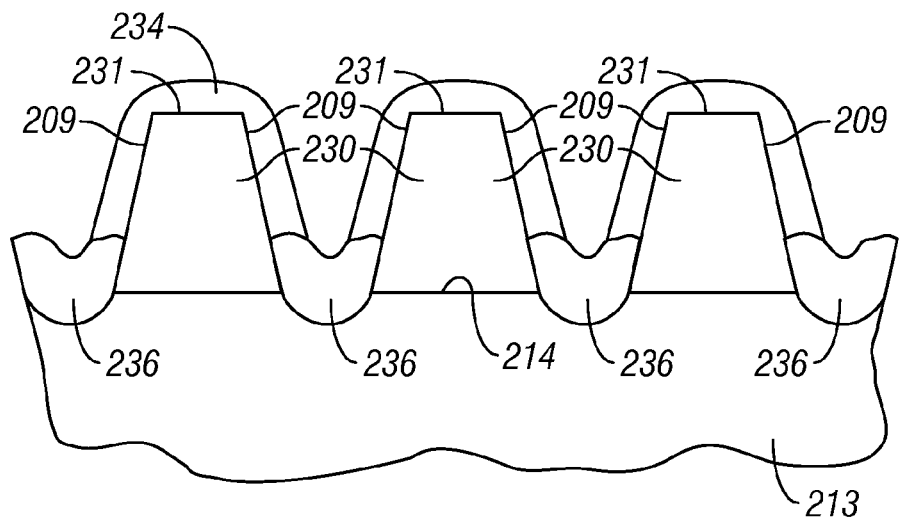

However, it is not required that the material of recording layer 234 be prevented from being deposited on the pillar sidewalls because the subsequent annealing can cause the recording layer material on the tops of the pillars to become magnetically isolated so they can function as discrete data bits. This enables the pillars to be made substantially shorter. This is illustrated in FIGS. 3D-3E. In FIG. 3D, the pillars 230 are shown as shorter than in FIG. 3C and the material of recording layer 234 is shown as being deposited as a generally continuous film over the tops 231 of pillars 230, the pillar sidewalls 209, and the trenches 232. This results in the ferromagnetic material in the trenches 232 being exchange coupled to the ferromagnetic material at the tops of the pillars 230, which would prevent the material at the tops 231 of the pillars 230 from functioning as discrete data bits. However, when annealed the ferromagnetism in the trenches 232 will be suppressed because of the formation of nonmagnetic regions 236, resulting in the isolation of the ferromagnetic material on top of the pillars. This is shown in FIG. 3E. This allows the use of pillars that would not otherwise be high enough to isolate the magnetic bits after deposition, which greatly simplifies the lithography process of forming the pre-etched substrate.

The process depicted by FIGS. 3D-3E has been demonstrated experimentally. A pre-etched substrate was formed with 5 nm thick pillars composed of 2 nm thick Ta/3 nm thick $SiO_2$ patterned on a Si wafer. The pillars were 500 nm in diameter and separated by 1000 nm. A ferromagnetic multilayer of [Co(0.3 nm)/Pd (0.9 nm)×8] was deposited onto the patterned wafer over the pillars, the pillar sidewalls and the trenches. A magnetic force microscopy (MFM) image showed the contrast of the pillars and the trenches and that magnetic material on the pillars and in the trenches was strongly exchange coupled. The structure was then annealed 185° C. for 10 minutes in vacuum. The MFM image after annealing showed that the magnetic contrast from the trenches was no longer apparent, leaving the magnetic signal from the pillars. Kerr magnetometry measurements after annealing also showed that the signal from the trenches was suppressed and the ferromagnetic tops of the pillars reversing independently.

Figure 4:
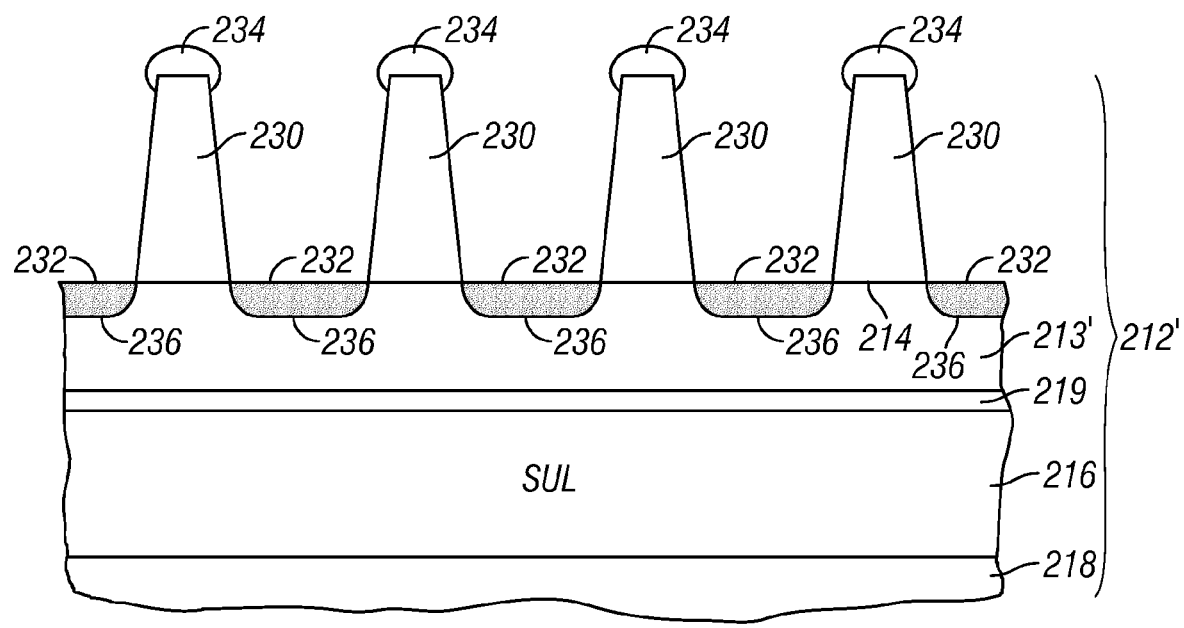
FIG. 4 is a sectional view of an embodiment of the invention similar to that depicted in FIG. 3C but wherein the substrate includes a soft underlayer (SUL).

FIG. 4 is a sectional view of an embodiment of the invention similar to that depicted in FIG. 3C but wherein the substrate 212' includes a SUL 216. The SUL 216 is formed on the substrate rigid support structure or base 218. The SUL 216 may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The base 218 may be any commercially available glass disk blank, but may also be a conventional aluminum alloy with a NiP surface coating, or an alternative disk blank, such as silicon, canasite or silicon-carbide. An optional adhesion layer (not shown) for the growth of the SUL, such as an AlTi alloy, may be formed on base 218 before deposition of the SUL 216.

As shown in FIG. 4, a diffusion barrier 219, which may be any material like that used for the pillars 230, is formed above the SUL 216. For example, a 1.5 nm thick Ta layer may serve as the diffusion barrier 219. In this embodiment the diffusion layer 213' is formed on the diffusion barrier 219 and may be a layer of sputter-deposited amorphous Si. During the annealing the diffusion barrier 219 prevents diffusion between the magnetic material in the SUL 216 and the material in the diffusion layer 213'.

Figure 5A:
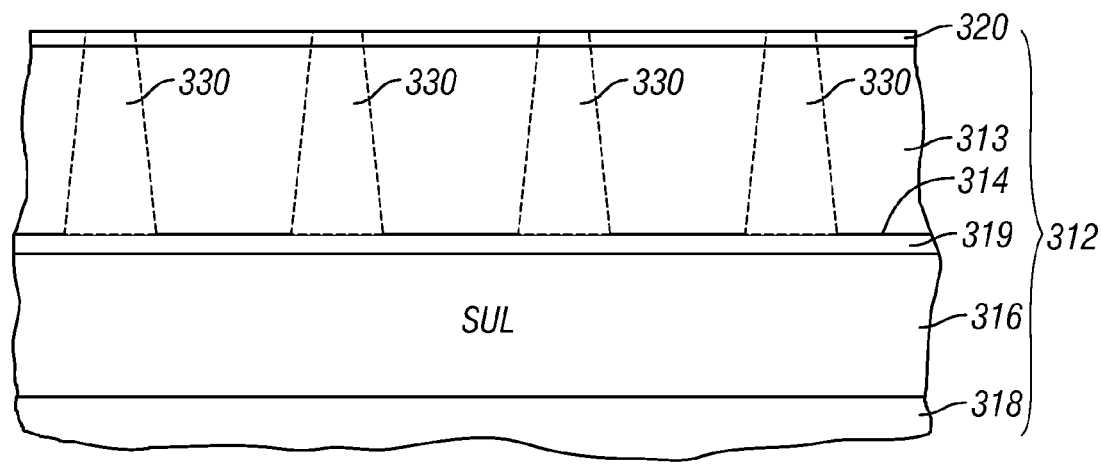
FIG. 5A is a sectional view of a substrate for another embodiment of the invention prior to patterning.

FIG. 5A is a sectional view of a substrate 312 prior to patterning in another embodiment of the invention. After patterning, the substrate 312 will have a first diffusion barrier 319 with generally planar surface 314 from which the pillars 330 (shown in dashed lines) will extend, with the pillars 330 being formed of the material of diffusion layer 313 with the material of a second diffusion barrier 320 on the pillar ends. The substrate 313 thus includes the base 318, a SUL 316, the first diffusion barrier 319, diffusion layer 313, and the second diffusion barrier 320.

Figure 5B:
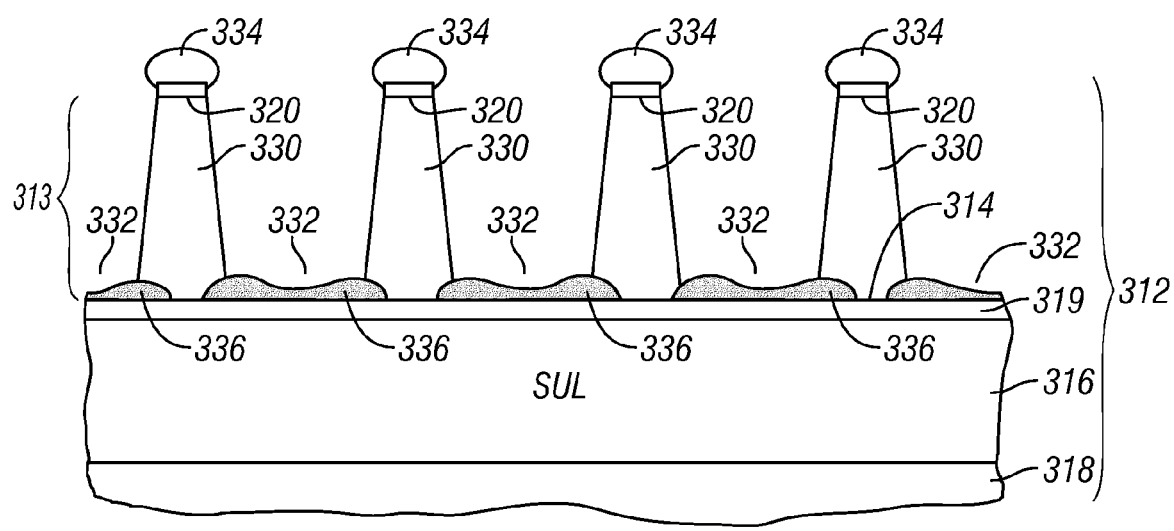
FIG. 5B is a view of the substrate of FIG. 5A after patterning and deposition of the magnetic recording layer and after annealing.

FIG. 5B is a view of the substrate 312 after patterning and deposition of the magnetic recording layer 334, and after annealing. In this embodiment the pillars 330 are formed of a diffusion material, such as Si or Ge, but have a diffusion barrier layer 320, such as Ta, on their ends. During annealing the magnetic recording layer material in the trenches 332 and the Si or Ge in the pillars 330 diffuse into one another and react to create nonmagnetic regions 336 in the trenches at the surface 314. The diffusion barrier 320 prevents diffusion between the Si or Ge of pillars 330 and the magnetic recording layer 334. The diffusion barrier 319 prevents diffusion between the Si or Ge of pillars 330 and the magnetic material in SUL 316. This embodiment enables the magnetic recording layer 334 to be located closer to the SUL 316 because the diffusion layer 313 also functions as the pillars 330, unlike the embodiment in FIG. 4 with diffusion layer 213'.

Figure 6:
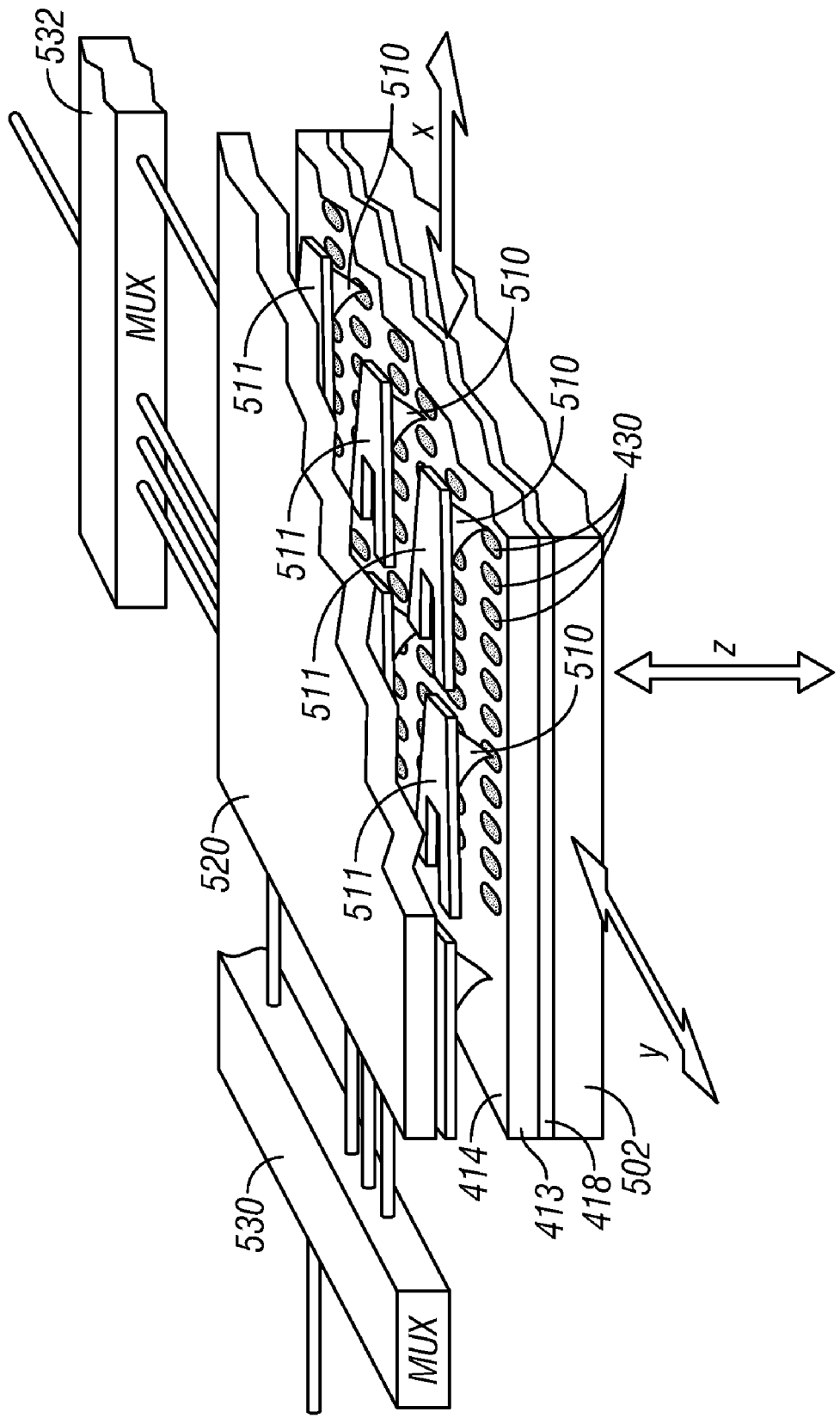
FIG. 6 is an illustration of a scanning probe implementation of this invention and shows the patterned bits arranged in an x-y array of mutually perpendicular rows.

The patterned perpendicular magnetic recording medium of this invention has been described above as implemented in a magnetic recording disk drive. However, the medium may also be implemented in a scanning probe system, like that described by Eleftheriou et al., "Millipede-A MEMS-Based Scanning-Probe Data-Storage System", *IEEE Transactions on Magnetics*, Vol. 39, No. 2, March 2003, pp. 938-945. The "Millipede" system is a thermo-mechanical system in which the data is recorded by heating the probe tips to cause pits in a polymeric storage medium. The scanning probe embodiment of this invention is shown in FIG. 6. The magnetic recording medium is shown with the substrate base 418, diffusion layer 413 with planar surface 414, and pillars 430 extending from surface 414. The pillars 430 have perpendicular magnetic recording material on their ends and are arranged as an x-y array of mutually perpendicular rows on the surface 414. The substrate base 418 is supported on a platform 502 of an xyz scanner. An array of magnetic-force-microscopy (MFM) type probe tips 510 with associated cantilevers 511 is fabricated on a chip 520. An MFM type probe capable of generating magnetic fields for writing is described in U.S. Pat. No. 5,900,729. The chip 520 and recording medium are movable relative to one another in the x-y directions by the xyz scanner. Thus each probe is associated with only a section of the total array and addresses only the pillars in that section. Multiplex drivers (MUX) 530, 532 allow write currents to be delivered to each MFM probe individually. The scanning probe system described above and depicted in FIG. 6 has an array of probes. However, the scanning probe magnetic recording system according to this invention is also possible with only a single probe in cooperation with an xyz scanner, in the manner of a conventional MFM system.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned magnetic recording disk comprising:
    a substrate comprising an underlayer of a soft magnetically permeable material selected from the group of alloys consisting of CoNiFe, FeCoB, CoCuFe, NiFe, FeAlSi, FeTaN, FeN, FeTaC, CoTaZr, CoFeTaZr, CoFeB, and CoZrNb, a diffusion barrier on the underlayer, an amorphous Si layer on the diffusion barrier and having a generally planar surface, and a plurality of pillars extending generally perpendicularly from said Si layer surface, the pillars having generally coplanar ends and a height equal to or greater than 5 nm and equal to or less than 50 nm and being arranged in radially-spaced concentric tracks and spaced-apart along the tracks;
    a recording layer having perpendicular magnetic anisotropy on the ends of the pillars, the recording layer being formed of a material comprising one or more elements selected from the group consisting of Co, Fe, Pt and Pd; and
    nonmagnetic regions at said surface between said pillars, said nonmagnetic regions comprising a compound of Si and at least one of said recording layer elements.

2. The disk of claim 1 wherein the recording layer comprises a multilayer of alternating layers of a first material selected from the group consisting of Co and Fe and a second material selected from the group consisting of Pt and Pd.

3. The disk of claim 1 wherein the recording layer material comprises a granular Co alloy.

4. The disk of claim 3 wherein the recording layer material further comprises an oxide of one or more of Si, Ta, Ti, Nb, Cr, V and B.

5. The disk of claim 1 wherein the recording layer material comprises a chemically-ordered alloy selected from the group consisting of CoPt, CoPd, FePt and FePd.

6. A perpendicular magnetic recording system comprising:
    the disk of claim 1;
    a write head for magnetizing the recording layer on the ends of the pillars in a direction generally perpendicular to the substrate surface from which the pillars extend; and
    a read head for detecting the magnetized recording layer on the pillar ends.

* * * * *